United States Patent
Huang et al.

(10) Patent No.: US 12,320,054 B2
(45) Date of Patent: Jun. 3, 2025

(54) SYSTEM FOR WASHING LAUNDRY

(71) Applicant: Nanoplus Life Biomedical Technology Co., Ltd., Taipei (TW)

(72) Inventors: Ching-Chao Huang, Taipei (TW); Tak Ngai Samuel Si, Taipei (TW)

(73) Assignee: Nanoplus Life Biomedical Technology Co., Ltd., Taipei (TW)

( * ) Notice: Subject to any disclaimer, the term of this patent is extended or adjusted under 35 U.S.C. 154(b) by 258 days.

(21) Appl. No.: 17/969,918

(22) Filed: Oct. 20, 2022

(65) Prior Publication Data
US 2024/0133104 A1  Apr. 25, 2024
US 2024/0229323 A9  Jul. 11, 2024

(51) Int. Cl.
| | | |
|---|---|---|
| *D06F 35/00* | (2006.01) | |
| *D06F 39/08* | (2006.01) | |
| *D06F 39/10* | (2006.01) | |
| *C02F 1/461* | (2023.01) | |
| *C02F 9/00* | (2023.01) | |

(52) U.S. Cl.
CPC .......... *D06F 35/002* (2013.01); *D06F 35/001* (2013.01); *D06F 35/003* (2013.01); *D06F 39/083* (2013.01); *D06F 39/10* (2013.01); *C02F 1/4618* (2013.01); *C02F 9/00* (2013.01); *C02F 2201/782* (2013.01); *C02F 2307/12* (2013.01)

(58) Field of Classification Search
CPC .... D06F 35/001; D06F 35/002; D06F 35/003; D06F 39/10; D06F 39/083; C02F 2307/12
See application file for complete search history.

(56) References Cited

U.S. PATENT DOCUMENTS

| | | | | |
|---|---|---|---|---|
| 5,097,556 A | * | 3/1992 | Engel ........................ | C02F 1/78 68/18 F |
| 5,181,399 A | * | 1/1993 | Engel ........................ | C02F 1/78 68/18 F |
| 5,241,720 A | * | 9/1993 | Engel ........................ | D06F 39/20 68/18 F |

(Continued)

FOREIGN PATENT DOCUMENTS

JP  2007268346 A  * 10/2007

OTHER PUBLICATIONS

Machine translation of JP-2007268346-A to Hamamura. (Year: 2007).*

*Primary Examiner* — Joseph L. Perrin
(74) *Attorney, Agent, or Firm* — Li & Cai Intellectual Property Office

(57) ABSTRACT

A system for washing laundry includes a cleaning fluid electrolytic hydrogen nano bubbles generation device for receiving tap water and electrolyzing the tap water to generate nano hydrogen bubbles and nano ion water or alkaline electrolytic water together as a cleaning fluid; a recycled water nano bubbles generation device for receiving tap water and water recycled by the system and generating ozone nano bubbles from the water, and at least one washing machine capable of performing pre-wash, main wash, or rinse. In the pre-wash or rinse, the recycled water nano bubbles generation device supplies the tap water having ozone nano bubbles to each washing machine through a pre-wash or rinse line. In the main wash, the cleaning fluid electrolytic hydrogen nano bubbles generation device supplies the main solution to each washing machine through, a cleaning fluid line.

3 Claims, 1 Drawing Sheet

(56) References Cited

U.S. PATENT DOCUMENTS

| | | | | |
|---|---|---|---|---|
| 5,493,743 | A | * | 2/1996 | Schneider ................. C02F 1/78 |
| | | | | 68/183 |
| 7,415,847 | B1 | * | 8/2008 | Ho ........................ D06F 35/001 |
| | | | | 68/12.18 |
| 2022/0316190 | A1 | * | 10/2022 | Connolly ................ E03B 1/042 |
| 2023/0175190 | A1 | * | 6/2023 | Lu ........................... D06F 39/04 |
| | | | | 8/137 |

* cited by examiner

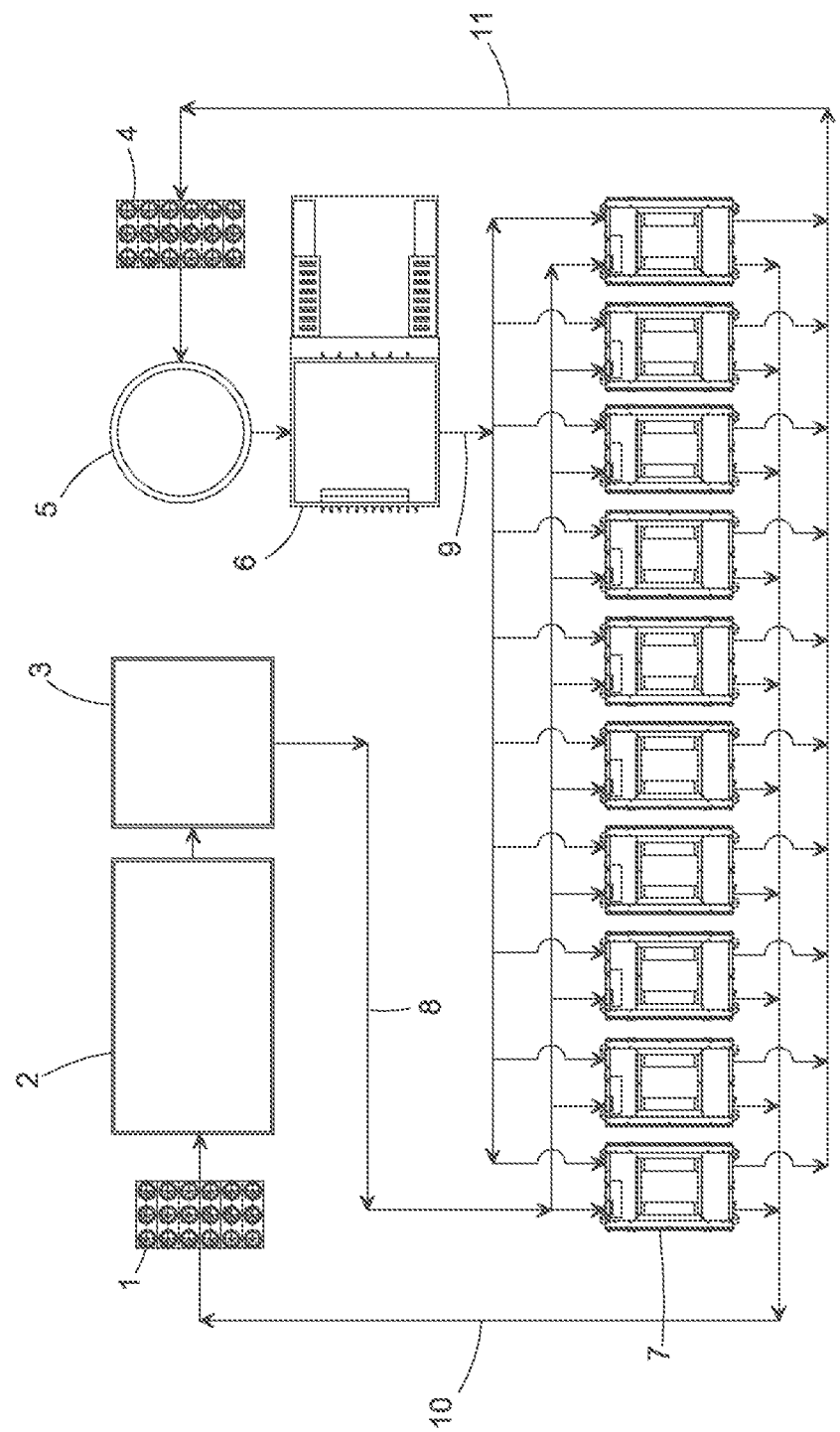

SYSTEM FOR WASHING LAUNDRY

FIELD OF THE INVENTION

The invention relates to systems for washing laundry and more particularly to a system for washing laundry applicable to a laundry which combines washing laundry and water treatment.

BACKGROUND OF THE INVENTION

Conventionally, laundry detergents or chemical cleaning fluids are used to wash laundry. After years of advancement, their cleaning capability is significantly increased. However, compositions of the chemical cleaning fluids are complicated and are not environmentally friendly. Surfactant of the chemical cleaning fluids is subject to accumulation on an inner surface of a perforated basket of a washing machine after laundry items have been washed and the fouling may cause a secondary pollution. After wash, remaining chemical cleaning fluids residues may cause itch on the skin and allergies.

It is desirable to have a system or method of washing laundry without using laundry detergents or chemical cleaning fluids for the sake of environment protection and human health. The system or method involves using electrolyzed water or nano ion water, ozone, air or hydrogen nano bubbles in water as a replacement of the laundry detergents or chemical cleaning fluids.

A conventional automatic washing machine comprises a sodium chloride addition device and an electrolysis device. Compressed ozone air and electrolyzed water flow to a perforated basket of a washing machine to mix with dirty clothes by controlling concentration of sodium chloride. The dirty clothes are thus cleaned by the mixture in a wash cycle.

Another conventional washing machine comprises a bubbles generation device and a control device. The bubbles are nano bubbles which are effective in increasing solubility of the chemical cleaning fluids.

The present inventor has filed several patent applications about electrolysis devices for generating nano ion water, nano bubbles generation devices and washing systems. The applications are not related to laundry washing, instead related to washing glass, sapphire, silicon parts, metal parts, electronic components, ceramics, and wafers in the process of manufacturing inorganic items or semiconductor manufacturing process. However, they lay the foundation for the technology of washing, laundry without using laundry detergents or chemical cleaning fluids.

The present inventor recently filed a patent application, entitled "System for washing laundry, nano bubbles ion water generation device and method of washing laundry". The application can solve the problem of environmental pollution caused by used laundry detergents or chemical cleaning fluids. But the application is only applicable to a single washing machine used by a home or individual. That is, the application is not applicable to self-serve laundry or business laundry having a plurality of washing machines.

Thus, the need for improvement still exists.

SUMMARY OF THE INVENTION

It is therefore one object of the invention to provide a system for washing laundry applicable to a laundry which combines washing laundry and washed water treatment.

It is another object of the invention to provide a system for washing laundry without using laundry detergents or chemical cleaning fluids for solving the problem of environmental pollution caused by used laundry detergents or chemical cleaning fluids, reduce rinse water usage.

It is a further object of the invention to provide a system for washing laundry for greatly increasing cleaning performance and greatly decreasing cleaning time.

To achieve above and other objects of the invention, the invention provides a system for washing laundry comprising a cleaning fluid electrolytic hydrogen nano bubbles generation device for receiving tap water and electrolyzing the tap water to generate nano hydrogen bubbles and nano ion water or alkaline electrolytic water together as a cleaning fluid; a recycled water nano bubbles generation device for receiving tap water and recycled water by the system and generating ozone nano bubbles from a mixture of the tap water and the recycled water; and at least one washing machine capable of performing one of a plurality of wash cycles including pre-wash, main wash, and rinse; wherein in the pre-wash or rinse, the recycled water nano bubbles generation device supplies the tap water, having ozone nano bubbles to each of the at least one washing machine through a pre-wash or rinse line so that each of the at least one washing machine is configured to perform the pre-wash or rinse; and wherein in the main wash, the cleaning fluid electrolytic hydrogen nano bubbles generation device supplies the main solution to each of the least one washing machine through a cleaning fluid line so that each of the at least one washing machine is configured to perform the main wash.

Preferably, there is further provided a pre-wash or rinse water filter wherein after the pre-wash or rinse has been performed, water flows through a pre-wash or rinse recycled water line into the pre-wash or rinse water filter and the pre-wash or rinse water filter is configured to filter the water.

Preferably, there is further provided a pre-wash or rinse water treatment system wherein after the filtered water has flowed to the pre-wash or rinse water treatment system, the pre-wash or rinse water treatment system is configured to treat the filtered water; wherein the treated water as recycled water flows to the recycled water nano bubbles generation device; and wherein the recycled water nanometer bubbles generation device is configured to generates ozone nano bubbles in the recycled water.

Preferably, there is further provided a cleaning fluid filter wherein after the main wash has been performed, water flows through a cleaning fluid recycled line to the cleaning fluid filter; and wherein the cleaning fluid filter is configured to removes solid particles from the water.

Preferably, there is further provided a dirty cleaning fluid ozone nano bubbles treatment device wherein after the recycled water has flowed to the washed cleaning fluid ozone nano bubbles treatment device, the washed cleaning fluid ozone nano bubbles treatment device is used with electrolysis device as an advance oxidation system for washed water treatment; and wherein the treated water flows to the cleaning fluid electrolytic hydrogen nano bubbles generation device.

The above and other objects, features and advantages of the invention will become apparent from the following detailed description taken with the accompanying drawings.

BRIEF DESCRIPTION OF THE DRAWINGS

Solo FIGURE schematically depicts a system for washing laundry of the invention.

DETAILED DESCRIPTION OF THE INVENTION

Referring to solo FIGURE, a system for washing laundry of the invention comprises a cleaning fluid electrolytic hydrogen nano bubbles generation device 6 for receiving tap water and electrolyzing the tap water to generate nano ion water (or alkaline electrolytic water) and nano hydrogen bubbles together as a cleaning fluid; a recycled water nano bubbles generation device 3 for receiving tap water and water recycled by the system and generating ozone nano bubbles from the water; and at least one washing machine 7 (a plurality of washing machines 7 are shown) capable of performing one of a plurality of wash cycles including pre-wash, main wash and rinse. In the pre-wash or rinse, the recycled water nano bubbles generation device 3 supplies the tap water having ozone nano bubbles to each washing machine 7 through a pre-wash or rinse line 8 so that each washing machine 7 can perform the pre-wash or rinse. In the main wash, the cleaning fluid electrolytic hydrogen nano bubbles generation device 6 supplies the main solution to each washing machine 7 through a cleaning fluid line 9 so that each washing machine 7 can perform the main wash.

Operation of the system for washing laundry of the invention is detailed below.

Initial activation. Tap water is supplied to the cleaning fluid electrolytic hydrogen nanometer bubbles generation device 6 through a hose. Next, an electrolysis device is activated to electrolyze the soften tap water to generate nano ion water (or alkaline electrolytic water) and nano hydrogen bubbles together as a cleaning fluid in which device parameters including current, voltage, water flow rate and concentration of electrolyte in a cation electrolyte tank are set and controlled by a detection device; and the cleaning fluid is stored in the cleaning fluid electrolytic hydrogen nano bubbles generation device 6 after the device parameters reach set values. The negative charge of the nano hydrogen bubbles surfaces are greater than that of nano bubbles of other gas. Thus, the nano hydrogen bubbles have larger washing capability.

System activation. The tap water is supplied to the recycled water nano bubbles generation device 3. The recycled water nano bubbles generation device 3 activates to generate ozone nano bubbles in the tap water which is stored in the recycled water nano bubbles generation device 3. Ozone nano bubbles can increase washing capability of the tap water and have an improved oxidation effect which can kill microorganisms, remove and oxidize dirt from clothes. Ozone gases are converted to ozone bubbles which have advantages of a prolonged period of time of existence in water, increased surface contact area, increased reaction, and decreased ozone consumption.

Washing. Dirty clothes are placed in a perforate basket of the washing machine 7 and next an automatic washing is performed. The washing, includes the following sequential wash cycles: pre-wash, first spin, main wash, second spin, rinse, and third spin as detailed below.

Pre-wash. The recycled water nano bubbles generation device 3 supplies the tap water having ozone nano bubbles to each washing machine 7 through a pre-wash (or rinse) line 8 so that dirty clothes can be washed initially.

First spin. The perforated basket of the washing machine 7 rotates to remove dirty water from the washed clothes. The dirty water is drained the washing machine 7 to a pre-wash (or rinse) water filter 1 through a pre-wash (or rinse) recycled water line 10. Water is filtered by the pre-wash (or rinse) water filter 1 to remove dirt and then the filtered water flows to a pre-wash (or rinse) water treatment system 2 for treatment. The treatment includes biological, chemical and physical treatment methods. The treated water (i.e., recycled water) flows to the recycled, water nano bubbles generating device 3 which activates to generates ozone nano bubbles in the recycled water.

Main wash. The cleaning fluid electrolytic hydrogen nano bubbles generation device 6 activates to flow cleaning fluid from it to each washing machine 7 through the cleaning fluid line 9 so that the washing machine 7 can perform a main wash on the dirty clothes.

Second spin. The perforated basket of the washing machine 7 rotates to remove dirty water from the washed clothes. The dirty water flows to a cleaning fluid filter 4 through a cleaning fluid recycled line 11. The cleaning fluid filter 4 removes solid particles from the dirty water. The filtered water flows to a dirty cleaning fluid ozone nano bubbles treatment device 5. The dirty cleaning fluid ozone nanometer bubbles treatment device 5 used with electrolysis device as an advance oxidation system for washed water treatment. This advanced oxidation treatment can purify dirty water, decrease chemical oxygen demand (COD), and increase oxidation power.

Rinse. The recycled water nano bubbles generation device 3 supplies the tap water having ozone nano bubbles to each washing machine 7 through the pre-wash (or rinse) line 8 so that dirty clothes can be washed the third time.

Third spin. The perforated basket of the washing machine 7 rotates to remove dirty water from the washed clothes. The dirty water flows to the pre-wash (or rinse) water filter 1 through the pre-wash (or rinse) recycled water line 10. The pre-wash (or rinse) water filter 1 removes solid particles from the dirty water. The filtered water flows to the pre-wash (or rinse) water treatment system 2 for treatment. The treatment includes biological, chemical and physical treatment methods. The treated water (i.e., recycled water) flows to the recycled water nano bubbles generation device 3 which activates to generates ozone nano bubbles in the recycled water.

End. After dirty clothes have been cleaned, an employee may take out the cleaned clothes and place same in a dryer for drying. This is the end of washing and washing machines 7 can be used for a next washing.

The system for washing laundry of the invention has the following advantages and benefits in comparison with the conventional art:

The system for washing laundry of the invention is applicable to a laundry which combines washing laundry and water treatment.

No laundry detergents or chemical cleaning fluids are involved. Thus, the problem of pollution caused by laundry detergents or chemical cleaning fluids is solved.

Cleaning performance is greatly increased and cleaning time is greatly decreased.

While the invention has been described in terms of preferred embodiments, those skilled in the art will recognize that the invention can be practiced with modifications within the spirit and scope of the appended claims.

What is claimed is:
1. A system for washing laundry comprising:
a cleaning fluid electrolytic hydrogen nano bubbles generation device configured to receive tap water and electrolyze the tap water to generate nano hydrogen bubbles with either nano ion water or alkaline electrolytic water to produce a cleaning fluid;

a recycled water nano bubbles generation device configured to receive tap water and water recycled by at least one washing machine and generate ozone nano bubbles from a mixture of the tap water and the recycled water to be supplied to the at least one washing machine;

at least one washing machine configured to perform one of a plurality of wash cycles including pre-wash, main wash, and rinse procedure;

a pre-wash or rinse water filter, wherein after pre-wash or rinse procedure has been performed, water flows through a pre-wash or rinse recycled water line into the pre-wash or rinse water filter, and the pre-wash or rinse water filter is configured to filter the water; and a pre-wash or rinse water treatment system arranged between the pre-wash or rinse water filter and the recycled water nano bubbles generation device, wherein the pre-wash or rinse water treatment system is configured to treat the filtered water from the pre-wash or rinse water filter and send the treated water to the recycled water nano bubbles generation device, wherein in the pre-wash or rinse procedure, the recycled water nano bubbles generation device supplies the tap water having ozone nano bubbles to each of the at least one washing machine through a pre-wash or rinse line so that each of the at least one washing machine is configured to perform the pre-wash or rinse, and wherein in the main wash, the cleaning fluid electrolytic hydrogen nano bubbles generation device supplies a main solution to each of the least one washing machine through a cleaning fluid line so that each of the at least one washing machine is configured to perform the main wash.

2. The system for washing laundry of claim 1, further comprising a cleaning fluid filter wherein after the main wash has been performed, water flows through a cleaning fluid recycled line to the cleaning fluid filter; and wherein the cleaning fluid filter is configured to removes solid particles from the water.

3. The system for washing laundry of claim 2, further comprising a dirty cleaning fluid ozone nano bubbles treatment device wherein after the recycled water has flowed to the dirty cleaning fluid ozone nano bubbles treatment device, the dirty cleaning fluid ozone nano bubbles treatment device is configured to electrolyze the ozone nano bubbles for treatment; and wherein the treated water flows to the cleaning fluid electrolytic hydrogen nano bubbles generation device.

* * * * *